(No Model.)
J. C. RAYMOND.
BICYCLE.
No. 588,472. Patented Aug. 17, 1897.
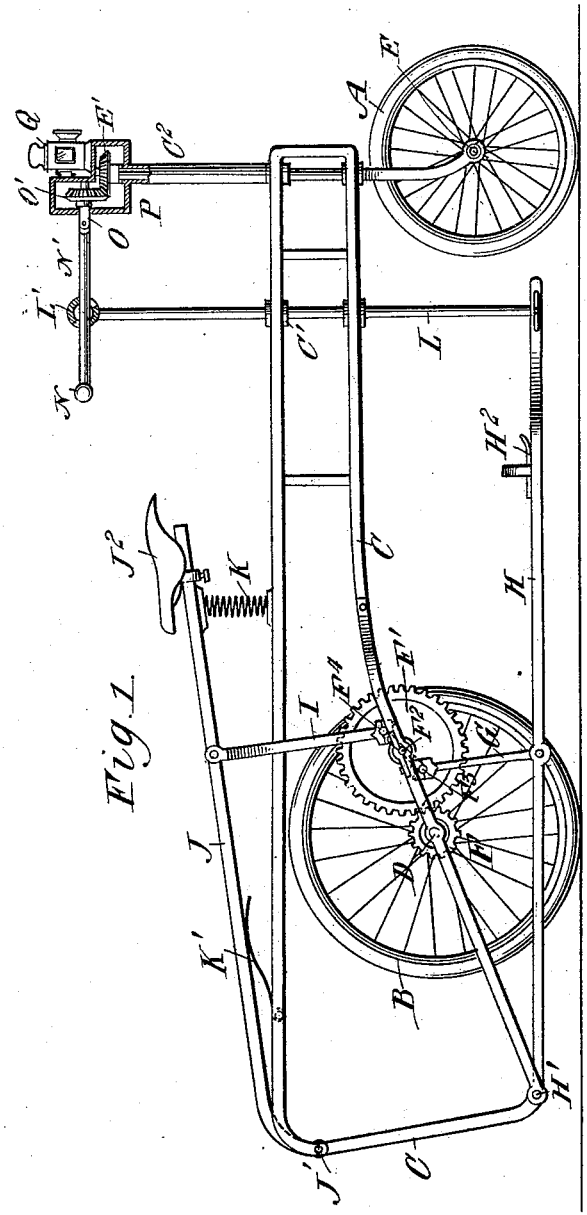
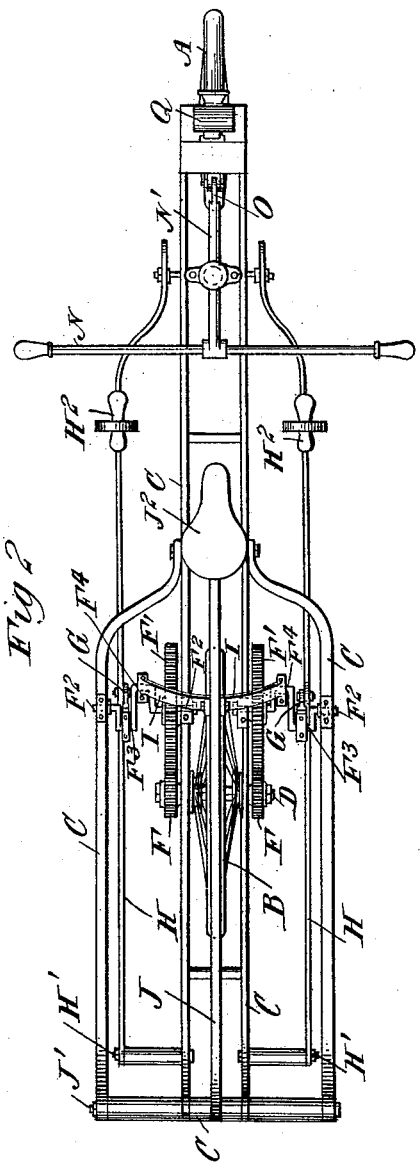
WITNESSES:
INVENTOR
J. C. Raymond.
BY
ATTORNEYS.

UNITED STATES PATENT OFFICE.

JOHN CARLYLE RAYMOND, OF BROOKLYN, NEW YORK.

BICYCLE.

SPECIFICATION forming part of Letters Patent No. 588,472, dated August 17, 1897.

Application filed May 23, 1896. Serial No. 592,736. (No model.)

*To all whom it may concern:*

Be it known that I, JOHN CARLYLE RAYMOND, of Brooklyn, in the county of Kings and State of New York, have invented a new and Improved Bicycle, of which the following is a full, clear, and exact description.

The object of the invention is to provide a new and improved bicycle which is simple and durable in construction and arranged in such a manner that the rider's whole body is in motion to insure a very healthy exercise on propelling the machine.

The invention will be fully described hereinafter and defined in the claim.

Reference is to be had to the accompanying drawings, forming a part of this specification, in which similar characters of reference indicate corresponding parts in both figures.

Figure 1 is a side elevation of the improvement, and Fig. 2 is a plan view of the same.

The improved bicycle is provided with a front steering-wheel A, a rear or driving wheel B, and a frame C, in which is journaled the shaft D for the said driving-wheel, as shown in the drawings.

In the front end of the frame C is mounted to turn a fork E, carrying the steering-wheel A. On the axle or shaft D for the drive-wheel B are secured pinions F, each in mesh with a gear-wheel F', secured on a crank-shaft $F^2$, journaled in suitable bearings in the frame C and formed with two crank-arms $F^3$ and $F^4$, of which the crank-arm $F^3$ is connected by a link G with a treadle H, extending longitudinally and fulcrumed at its rear end at H' on the rear part of the frame C. On the front or free end of each treadle H is secured a pedal $H^2$, adapted to be engaged by the rider's feet for imparting a swinging motion to the treadles H, so as to cause the links G to act on the crank-arms $F^3$ and turn the crank-shaft $F^2$, the gear-wheel F', and pinion F to rotate the rear drive-wheel B, so as to propel the machine forward. The other crank-arm $F^4$ on each crank-shaft $F^2$ is pivotally connected with the U-shaped link I, extending upwardly and pivotally connected at its upper end with a lever J, fulcrumed at its rear end at J' on the frame C.

On the forward or free end of the lever J is secured a seat or saddle $J^2$, adapted to be engaged by the operator resting his feet on the pedals $H^2$, as previously explained.

The lever J rests on springs K and K' to insure an easy riding of the bicycle. The free ends of the treadles H are pivotally connected with an upwardly-extending shaft L, fitted to slide in suitable bearings C', formed on the frame C, and on the upper end of the said shaft L is formed a ball-joint L', engaged by the stem N' of a handle-bar N, adapted to be taken hold of by the rider seated on the seat $J^2$. The outer end of the horizontally-extending stem N' is pivotally connected with a shaft O, journaled in suitable bearings in a frame P, attached to the upper end of the front-fork head $C^2$, secured on the front end of the frame C.

On the shaft O is fastened a beveled gear-wheel O', in mesh with a beveled gear-wheel E', secured on the upper end of the stem of the fork E, so that when the operator turns the handle-bar N up or down a rotary motion is given by the shaft O and gear-wheels O' and E' to the front fork E, so as to steer the front wheel A to the right or left, according to the direction in which the handle-bar N is turned.

The frame P is arranged to support a lantern Q of any approved construction.

Now it will be seen that when the machine is used the operator by his weight acting on the lever J and by his feet pressing the treadles H imparts a forward motion to the bicycle by the connections above described, and at the same time the rider's whole body is made active, so that a very healthy exercise is obtained.

It is understood that when the treadles H move up and down a like movement is given to the shaft L, and consequently to the handle-bar N, so that the arms are brought in motion on each full up-and-down stroke of the rider's body.

It is further understood that the crank-arms $F^3$ and $F^4$ are arranged diametrically opposite each other, so that when the seat $J^2$ moves downward the treadles H move upward, and when the seat has finally reached its lowermost position then the operator by pressing on the pedals $H^2$ imparts a desired swinging motion to the treadles H to cause a lifting of the saddle J² to its former position. This operation is repeated during each full stroke, it being understood that the weight of the rider causes an alternate desired swinging of the levers J and H to propel the vehicle forward.

Having thus described my invention, I claim as new and desire to secure by Letters Patent—

A velocipede having a frame, a steering-fork mounted in the front extremity of the frame, a wheel carried therein, an arm having pivotal connection with the steering-fork, two treadles respectively fulcrumed at the rear of the frame and extending forwardly adjacent to the steering-fork, a vertically-movable rod held in the frame and pivotally connected to the front extremities of the treadles and to the arm, a drive-wheel mounted in the frame, a pinion-wheel fixed to each end of the axle of the drive-wheel, two double-crank shafts transversely journaled in the frame, a spur-wheel on each crank-shaft, the spur-wheels respectively meshing with the pinions, a link pivoted to each treadle and respectively pivoted to one crank of the crank-shafts, a lever fulcrumed at the rear of the frame and extending forwardly beyond the driving-wheel, the lever being centrally located on the frame, a seat carried by the lever, a spring pressing the lever upward, and two additional links carried by the lever and respectively connected to the remaining links of the crank-shafts, substantially as described.

JOHN CARLYLE RAYMOND.

Witnesses:
  JAS. M. HENLEY,
  THEO. G. HOSTER.